United States Patent [19]
White

[11] Patent Number: 5,471,950
[45] Date of Patent: Dec. 5, 1995

[54] ANIMAL CARRIER WITH DETACHABLE LITTER BOX

[76] Inventor: Elizabeth S. White, P.O. Box 3734, Eugene, Oreg. 97403

[21] Appl. No.: 142,514

[22] Filed: Oct. 25, 1993

[51] Int. Cl.[6] ..................................................... A01K 1/03
[52] U.S. Cl. ............................................. 119/19; 119/165
[58] Field of Search ........................................ 119/19, 165

[56] References Cited

U.S. PATENT DOCUMENTS

| | | | |
|---|---|---|---|
| D. 276,752 | 12/1984 | Kinzie | D30/99 |
| 1,581,082 | 4/1926 | Clarke | 119/19 |
| 3,246,630 | 4/1966 | Dearing et al. | 119/165 |
| 3,618,568 | 11/1971 | Breeden | 119/19 |
| 3,738,322 | 6/1973 | Smith | 119/15 |
| 3,745,975 | 7/1973 | Prucha | 119/165 |
| 3,791,347 | 2/1974 | Lovell | 119/19 |
| 3,791,348 | 2/1974 | Marnett | 119/19 |
| 3,885,523 | 5/1975 | Coleman | 119/165 |
| 4,029,048 | 6/1977 | Gershbein | 119/165 |
| 4,111,157 | 9/1978 | Haugen | 119/165 |
| 4,161,157 | 7/1979 | Haugen | 119/165 |
| 4,171,683 | 10/1979 | Godin | 119/15 |
| 4,224,899 | 9/1980 | Cruchelow et al. | 119/19 |
| 4,352,340 | 10/1982 | Strubelt | 119/170 |
| 4,432,303 | 2/1984 | Ellerstorfer | 119/17 |
| 4,760,816 | 8/1988 | Rhodes | 119/165 |
| 4,803,952 | 2/1989 | Houser | 119/19 |
| 4,838,202 | 6/1989 | Neu | 119/165 |
| 4,852,520 | 8/1989 | Goetz | 119/19 |
| 4,858,561 | 8/1989 | Springer | 119/165 |
| 5,014,649 | 5/1991 | Taft | 119/168 |
| 5,046,457 | 9/1991 | Ashcroft et al. | 119/168 |
| 5,054,426 | 10/1991 | Panarelli et al. | 119/19 X |
| 5,092,270 | 3/1992 | Simons et al. | 119/19 |
| 5,092,277 | 3/1992 | Baillie et al. | 119/165 |
| 5,165,366 | 11/1992 | Harvey | 119/165 |

OTHER PUBLICATIONS

Advertisement for "Kitty Karrier," a product of Double S Enterprises, P.O. Box 6032, Clearfield, Utah 84015.

*Primary Examiner*—Robert P. Swiatek

[57] ABSTRACT

An animal litter container (20) which is constructed so that it may be attached to a conventional animal carrier (22). The litter box has an opening (30) in its front wall (28) which meets an opening (34) cut or manufactured into the rear wall (32) of an animal carrier. Access is therefore provided for movement between the litter box and the carrier. A method is provided for attaching the litter box securely to the carrier. A latch is provided to secure the opening in the rear carrier wall when the litter box is detached from the carrier, so that the escape-proof integrity of the animal carrier is completely restorable for times when it is to be used alone (see FIG. 3A). A seal (122) is provided to contain the litter box's contents and odors when the litter box is not in active use.

15 Claims, 4 Drawing Sheets

ANIMAL CARRIER WITH DETACHABLE LITTER BOX

BACKGROUND—FIELD OF INVENTION

This invention relates to animal litter devices, specifically to a litter container of versatile and improved function intended primarily for cats.

BACKGROUND—DESCRIPTION OF PRIOR ART

Animals such as cats are commonly transported in conventional airline-approved animal carriers. These carriers are very handy, lightweight, easy-to-clean, durable, inexpensive, and very secure. They break down for storage. Their use is simple and expedient for very short trips. However for more extended travel the eliminative needs of the animal must be considered.

Using a separate cat litter box during travel involves great mess, smell, and misery for all. It is impossible to predict a cat's need for the litter box, and a cat in a carrier will often not indicate its need clearly or at all. When the litter box is used, litter and fecal matter is almost always tracked and scattered around the vehicle. This is depressing and inconvenient to clean up. Stowing the litter box when it is not in use presents complications; a possibility always exists that the box will be knocked over and spilled, and it is hard to find a good place for such an unsavory object, especially if the box is open-topped. Enclosed litter boxes with front openings are available, but are bulky and a nuisance to take along.

The inability to tell when a cat may need to eliminate means often waiting at very inconvenient times to give the cat a chance to use the box. Additionally, at such times an animal is often afraid of unusual surroundings. It wants only to take refuge under a car seat or other shelter and observe its surroundings from a safe vantage point. Putting a small litter box within the animal's carrier is rarely workable; and a severely unpleasant situation arises when an animal relieves itself in a carrier.

Furthermore, safety often requires the containment of animals during travel. If a cat is released from its carrier to be allowed access to a litter box, it must be shut within a closed area. This poses limitations, and the possibility of inadvertent escape and loss of the animal. Problems are multiplied during warm or hot weather, when vacationing is most attractive. One might, for example, want to stop and spend time by a river or at a beach where shaded parking is often unavailable. In such a situation an animal can be taken along in its carrier and shaded or placed in a shady spot; however, relaxation is difficult when it is not known whether the animal is comfortable. As cats will often bolt if released in strange settings, release is rarely feasible; and cats cannot usually be walked on leashes to relieve themselves as dogs can. This is a highly uncomfortable and restrictive situation for both animal and human.

These problems are a major source of inconvenience and of mental and emotional uneasiness. Yet cats enjoy being with the people they know and otherwise are a real pleasure to have along. If the stated problems were overcome many more people would bring cats with them on trips, especially as boarding animals is often prohibitively expensive, and placing them with friends is an imposition. Boarding can also be an unpleasant, traumatic, or at best, boring experience for animals.

A solution to these problems would bring major relief to those who presently travel with cats. This group includes people who regularly travel cat show circuits and many others who need carriers, without litter boxes, available to them at times.

Previous attempts to solve this uncomfortable set of problems have been only partially successful. Devices which contain litter to varying degrees have been patented. Although prior patents address certain aspects of the situation described, none offers a comprehensive solution.

U.S. Pat. No. 4,838,202 to Neu, 1989 Jun. 13, describes an open litter box set within a larger open box. The outer box collects litter scattered from the inner box. Litter will still be tracked by the feet of an emerging animal, however. The box is awkward to stow during travel, can be knocked over, does not provide sheltered use, and does not contain an animal. These disadvantages are shared by all litter containers of open-box design.

U.S. Pat. No. 3,246,630 to Dearing et al., 1966 Apr. 19, and U.S. Pat. No. 3,885,523 to Coleman, 1975 May 27, reduce tracking of litter from a box with an enclosed top and sides, but do not contain an animal. Litter can spill from the opening of either of these boxes if the box is knocked over, and their relatively large size is awkward for travel.

The following patents disclose litter boxes, which, when set up for use, all provide enclosed sides:

1. U.S. Pat. No. 3,745,975 to Prucha, 1973 Jul. 17.
2. U.S. Pat. No. 4,111,157, to Haugen, 1978 Sep. 5.
3. U.S. Pat. No. 4,161,157 to Haugen, 1979 Jul. 17.
4. U.S. Pat. No. 4,352,340 to Strubelt, 1982 Oct. 5.
5. U.S. Pat. No. D276,752 to Kinzie, 1984 Dec. 11.
6. U.S. Pat. No. 4,760,816 to Rhodes, 1988 Aug. 2.
7. U.S. Pat. No. 5,014,649 to Taft, 1991 May 14.
8. U.S. Pat. No. 5,046,457 to Ashcroft et al., 1991 Sep. 10.

All of these except Prucha have an enclosed top in addition to the enclosed sides, and an access opening for an animal. Prucha has an open top in use. In none of these is the access hole inescapable; in all, litter can still be spilled from an upset box.

Rhodes and Taft have provided means of containing litter until the box is first used. They do not provide for its convenient stowage thereafter. Taft's litter box in its collapsed state takes up less room than most, but requires setting up and breaking down for each use to take advantage of this feature. Rhodes' has a tubular support shell which does not collapse.

U.S. Pat. No. 5,092,277 to Baillie et al., 1992 Mar. 3, contains litter scatter but is unsuitable for travel. It does not provide containment of an animal.

U.S. Pat. No. 4,858,561 to Springer, 1989 Aug. 22, describes an enclosure for a removable litter tray. The enclosure is collapsible for stowage. While preventing litter from being scattered out of the box, it does not deal with the tracking problem. It also contains spillage and odors to a degree. However it has an internal frame assembly with a surrounding cover which presents cleaning difficulties. An animal may leave it at will. It is impractical to stow the frame and frame cover while traveling; one is left with a tray of litter to deal with, and must reassemble the enclosure for use.

U.S. Pat. No. 4,029,048 to Gershbein, 1977 Jun. 14, describes a litter box which attaches to the outside of a house. It may be removed and used as a carrier or litter box for transporting an animal. This device can be used as a litter box to contain an animal until it relieves itself. However it would not be humane, sanitary, or practical to confine an animal solely to its litter box during extended travel. It is well known that animals hate to soil an area in which they are confined. Cleaning the litter box involves an awkward handling situation, particularly with a frightened animal or one intent on escape; the animal has to be removed in order to clean the litter box. If Gershbein's box is used simply as a litter box, all of the associated problems ensue. These include the necessity of transferring an animal to the litter box at unreliably productive times, and facing a truly objectionable and unsanitary mess. In essence, it is an enclosed litter box with the capability of trapping an animal in with the litter. It doesn't comprehensively address the problems of any but the briefest of travel with cats.

U.S. Pat. No. 4,224,899 to Cruchelow et al., 1980 Sep. 30, describes a pet shelter to be mounted in a house wall opening. It has openings in both the front and rear walls of the shelter, to give access outdoors or to the house interior. It does not address travel or litter use, and is specifically designed to fit to a house.

U.S. Pat. No. 3,738,322 to Smith, 1973 Jun. 12, is for a pet shelter to be mounted through an opening in a building wall. This pet shelter gives an animal access only to the outside of the building.

U.S. Pat. No. 4,171,683 to Godin, 1979 Oct. 23, is an assembly of modules mounted on a movable base. Modules are designed to fill a number of animal needs, including elimination, and the entire unit may be covered, containing an animal within. The relatively complex assembly is large and not suitable for travel. Modules apparently cannot be separated from the unit for contained use by themselves or in combination with each other.

U.S. Pat. No. 3,618,568 to Breeden, 1971 Nov. 9, describes a pet house which may have adjacent and simultaneously accessible sleeping and litter compartments. However this device is specifically designed as a piece of household furniture. It does not lend itself to travel. The litter and sleeping compartments are separated only to a moderate extent.

U.S. Pat. No. 4,803,952 to Houser, 1989 Feb. 14, describes a disposable pet shelter with separated areas for housing, resting, and litter tray accommodation. Though portable, this shelter is meant for home use. All areas are open and provide no optional containment for an animal. This shelter would be awkward to use for travel. It is made of cardboard and therefore is not very durable. Although the area provided for a litter tray is substantially enclosed, the problems of litter and excrement tracking and spilling remain. A cat must enter the litter area from an outside entrance; there is no direct access between the shelter and litter areas.

U.S. Pat. No. 5,092,270 to Simons et al., 1992 Mar. 3, shows a carrier comprising a living area and a litter area with a passageway between the two areas. It is inconvenient not to have use of a simple animal carrier, without a litter area, for the frequent times when a simple carrier is necessary or useful. In these situations the combined apparatus is unnecessarily bulky and clumsy, or cannot be used at all. Also there are definitely times when an independent litter box is useful. The Simons box does not offer a full range of options.

The Simons litter compartment is extremely difficult or impossible to clean properly. Its walls form a substantially solid box. Its interior is accessible only by an opening into the living compartment, and by a relatively small slot through which the litter tray is inserted. Feces and urine often end up on litter box walls. Litter, dust, and excrement will get into the litter compartment around the tray edges, as well, and inevitably will spill out of the tray's insertion-and-removal opening. The interior of a litter box must be accessible for thorough cleaning.

A version of the carrier of Simons is made with a large door so as to provide access to the litter area. This does not solve the cleaning problem; this carrier is still very difficult to clean properly. Additionally, an animal cannot be kept confined to the carrier when cleaning the litter area. In this version, the opening between the living and litter areas is too large to adequately separate these two areas. The animal is continuously openly exposed to the litter area.

U.S. Pat. No. 4,432,303 to Ellerstorfer, 1984 Feb. 21, describes a birdbath which hooks to the side of a cage, an opening in the bath's side meeting an opening in the birdcage. It is intended only for use with birdcages and would not be suitable for animal litter use.

U.S. Pat. No. 5,165,366 to Harvey, 1992 Nov. 24, shows a window-mounted litter unit for installation on the outer wall of a house. This unit is designed strictly for use with a human dwelling and would be far too cumbersome for travel.

OBJECTS AND ADVANTAGES

Accordingly, several objects and advantages of my invention are:

(a) to provide an improved litter box, especially useful in simplifying traveling with cats and other small domestic animals, (b) to provide a litter box which makes it possible for an animal to eliminate bodily waste during travel or transport upon need and under sheltered conditions, without attention, intervention, or assistance from human companions, (c) to provide a litter box which therefore gives control over previously awkward and uncomfortable physical variables, (d) to provide a litter box which allows use by an animal while the animal is safely, humanely, and reliably contained, (e) to provide a litter box which recognizes and respects the nature of the cat; and which simply, clearly, and workably meets both a cat's needs and those of its human companions, (f) to provide a litter box which accordingly generates mutual relaxation, peace of mind, comfort, and enjoyment, (g) to provide a litter box which accommodates an animal's needs during both brief and extended travel, (h) to provide a litter box which is conveniently sized, durable, and light in weight, (i) to provide a litter box which is simple to use and simple to stow, (j) to provide a litter box which may be stowed without the risk of litter spillage from the box, (k) to provide a litter box which largely eliminates the problems of tracking and spilling of clean litter, unclean litter, and animal waste from the box to surrounding environs. This furnishes unprecedented neatness and convenience, (l) to provide a litter box which enhances sanitation, and animal and human health, (m) to provide a litter box which promotes relaxed, responsible animal care and a safe driving environment, (n) to provide a litter box which, when conjoined with an animal carrier, forms a stable, cohesive unit with the carrier, (o) to provide a litter box which may be cleaned while an animal is safely confined to its carrier, (p) to provide a litter box which may also be used at home or a destination without the carrier attached, (q) to provide a litter box which accordingly prevents waste of money and resources, clutter, and duplication of function, (r) to provide a litter box which, when used at home or a destination (attached to an animal carrier), significantly reduces the spread of litter tracked from the box without elaborate additional means for doing so, and (s) to provide a litter box which is easy to clean thoroughly.

Additional objects and advantages of my invention are:

(t) to provide a litter box for use in conjunction with commonly available, widely used commercial and airline-approved animal carriers; and which does not interfere with the intended functions of these carriers when they are required for use by themselves, (u) to provide a litter box which complements a well-established, widely used product for which there is a continuing need; and which enhances the usefulness and convenience of this product without detracting from its effectiveness when it is used without the litter box, (v) to provide a litter box which incorporates simple, established manufacturing methods and materials, (w) to provide a litter box which has some recreational value for a traveling animal, (x) to provide a litter box which accordingly makes it possible for an animal to move between spaces, getting some variety and exercise while confined. Cats in particular love climbing through holes and exploring small sheltered enclosures, (y) to provide a litter box which makes it humanely and conveniently possible for more people to take cats traveling with them, obviating the need for expensive and often undesirable boarding, (z) to provide a litter box which frees those owners of cats who are reluctant to or who cannot afford to leave their animals, to travel more freely, and (aa) to provide a disposable version of this litter box for times when disposability is a significant advantage.

Further objects and advantages of my invention will become apparent from a consideration of the drawings and ensuing description.

| Reference Numerals In Drawings | | | |
|---|---|---|---|
| 20 | litter box | 22 | animal carrier |
| 24 | upper section | 26 | lower section |
| 28 | upper front wall | 30 | access hole |
| 32 | upper rear wall | 34 | access hole |
| 36 | lower front wall | 38 | spacing compartment |
| 40 | lower rear wall | 42 | handle |
| 44 | base wall | 46 | base wall |
| 48 | vent | 50 | top wall |
| 52 | flanged lip | 54 | flanged lip |
| 56 | holes | 58 | holes |
| 60 | bolts | 62 | nuts |
| 64 | slot | 66 | lower side walls |
| 68 | lower rear wall | 72 | flange |
| 74 | front portion of 54 | 76 | flanged lip |
| 78 | nut | 78a | shaft of 78 |
| 80 | slot | 82' | nuts |
| 84' | bolts | 86' | holes |
| 90 | side walls | 92 | front wall |
| 94 | vent cover | 96 | handgrip |
| 98 | recessed lip | 100 | recessed surface |
| 102 | vent holes | 104 | openings |
| 106 | upper rear wall | 108 | upper side walls |
| 112 | flange | 114 | beveled edge |
| 116 | point location | 118 | access hole lip |
| 120 | recessed lip | 122 | flexible seal |
| 124 | sealing surface | 126 | rim |
| 128 | bead | 130 | removal tab |
| 132 | flange | 134 | holes |
| 136 | extensions | 138 | access hole door |
| 140 | latching mechanisms | 142 | door cover |
| 144 | keepers | | |

SUMMARY

In accordance with the present invention, an enclosed litter box has an opening in one side. The litter box is easily and securely attached against the back of an animal carrier. The opening in the litter box joins a matching opening in the animal carrier. This gives a confined animal free access to a litter box. The litter box is easily removed for cleaning, and a simple latch is provided which enables both the litter box and the carrier to be used effectively independently of one another. A removable seal is provided which contains the litter box contents and odors when the litter box is not in use.

DESCRIPTION—FIG. 1

A preferred embodiment of a litter box according to my invention is illustrated in FIGS. 1 through 4.

Figure 1:
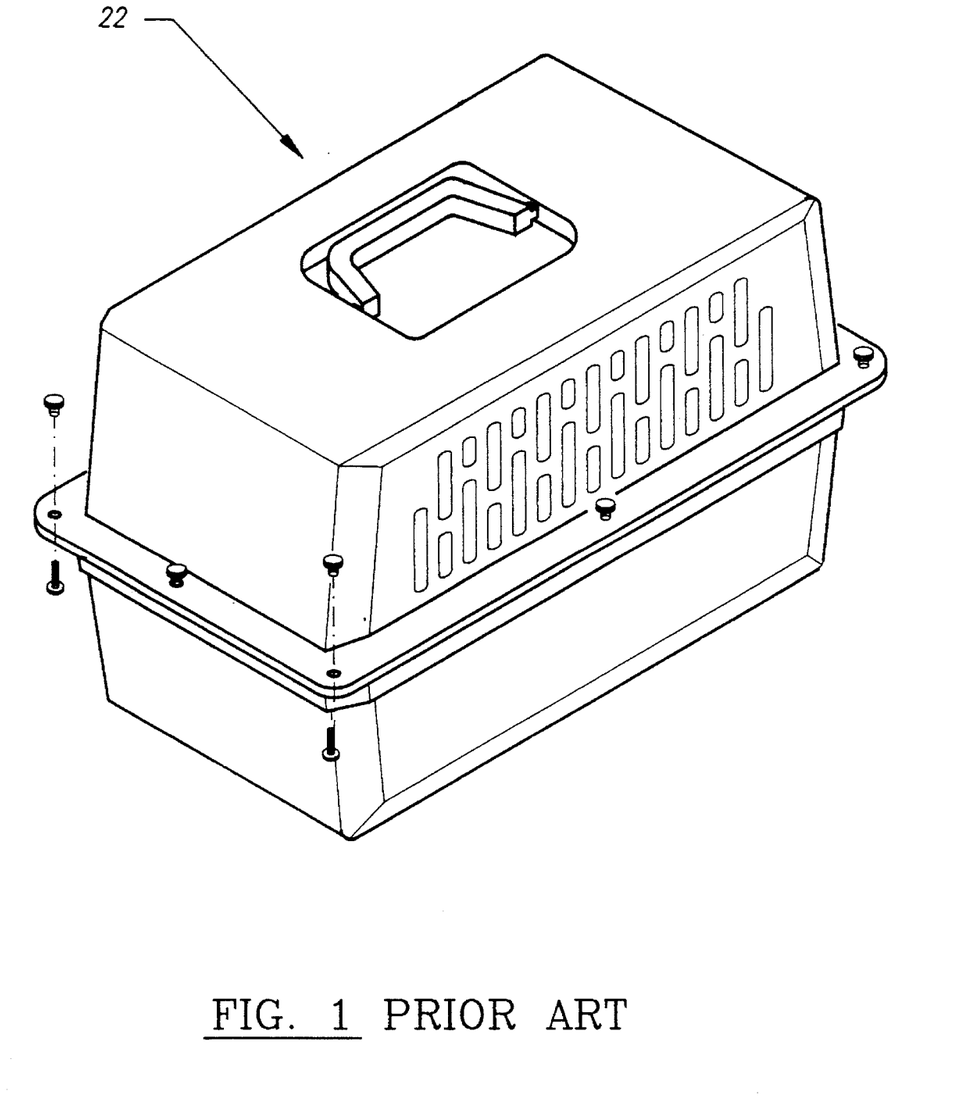
FIG. 1 shows an upper rear perspective view of a conventional-style (prior art) animal carrier.

FIG. 1 shows an upper rear perspective view of a conventional (prior art) animal carrier. This drawing is included to make it simple to see features (illustrated in FIG. 3A) which are added to the carrier in order to make it usable with my litter box. An animal traveling in this carrier, if it needs to eliminate bodily wastes, must soil the carrier. The animal must thereafter occupy the soiled space until its journey is complete, if it is traveling in the cargo area of an airplane; or until it is possible for the carrier to be cleaned, if traveling by car. The cleanup of such a mess is extremely awkward in an airport or during car travel. Very often, the animal is soiled from its confinement in the fouled carrier, and badly needs bathing.

DESCRIPTION—FIG. 2

Figure 2:
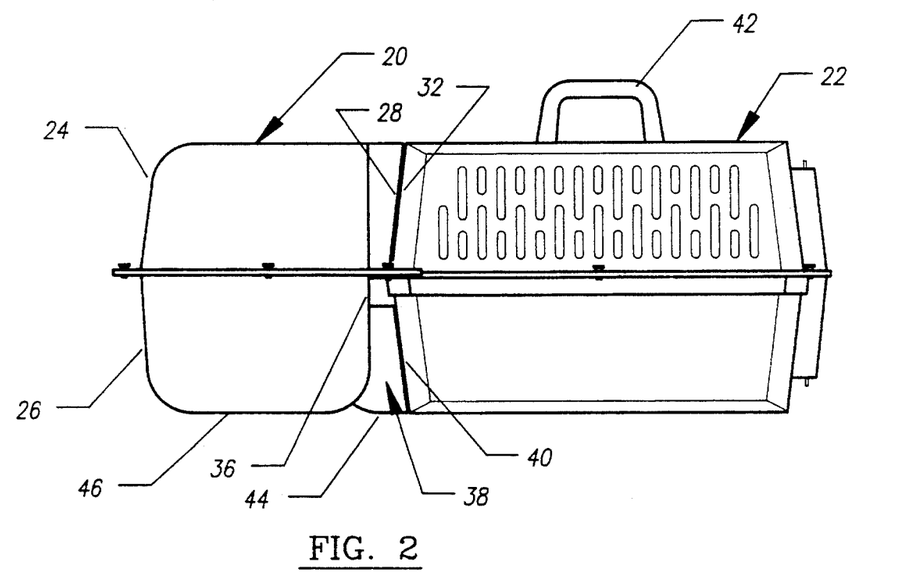
FIG. 2 shows a side view of one embodiment of a litter box in place on a conventional animal carrier, in accordance with my invention.

FIG. 2 shows a side view of my litter box 20 in combination with a conventional animal carrier 22. Litter box 20 is attached to carrier 22 in this embodiment by a latch illustrated in FIG. 3A and described subsequently.

Figure 4:
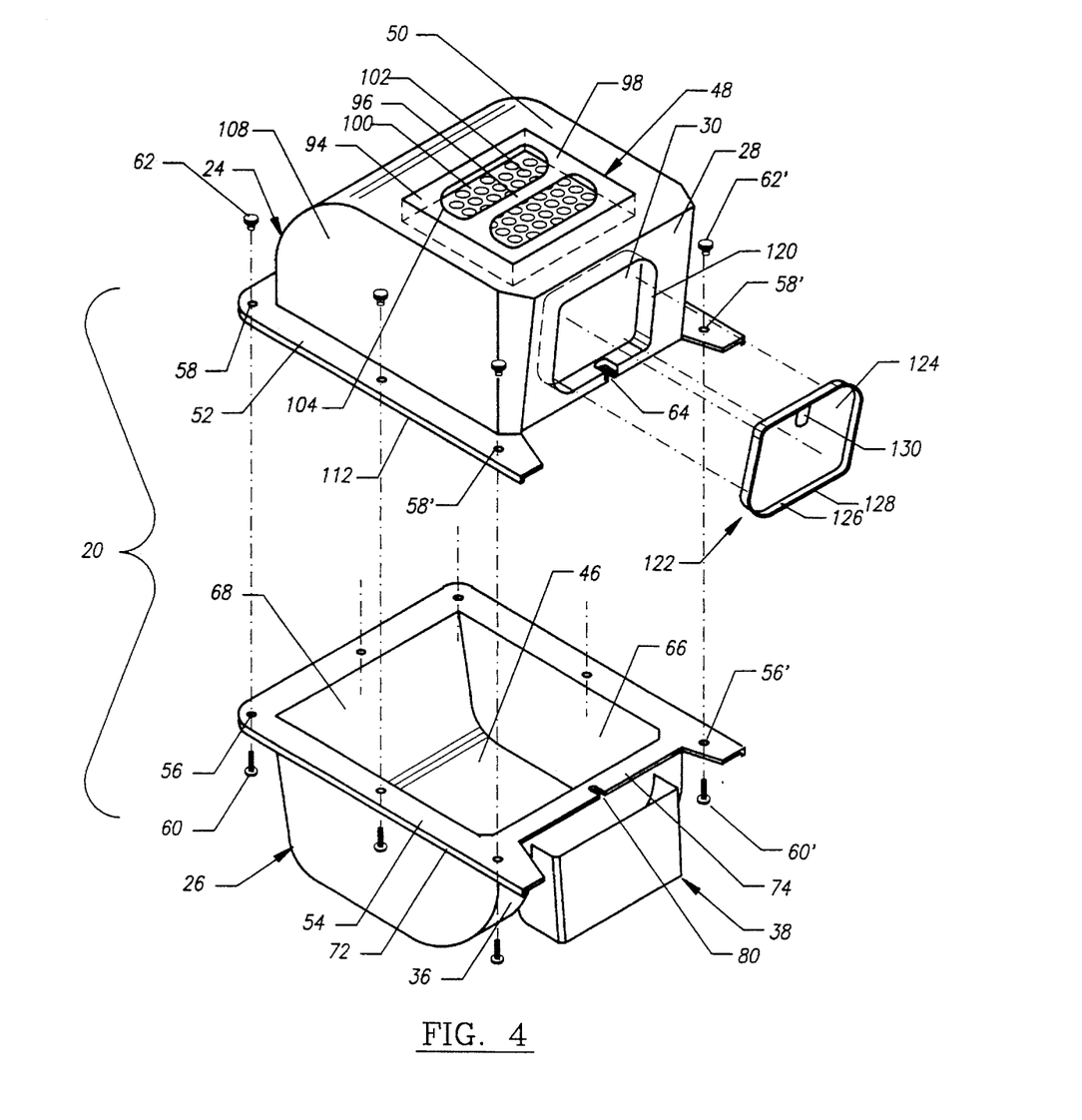
FIG. 4 is an exploded perspective view of my litter box with its upper and lower sections separated, with an access-hole seal shown.

Litter box 20 is made of an upper part or section 24 and a lower part or section 26 attached together by a method illustrated in FIG. 4 and described infra.

Figure 3:
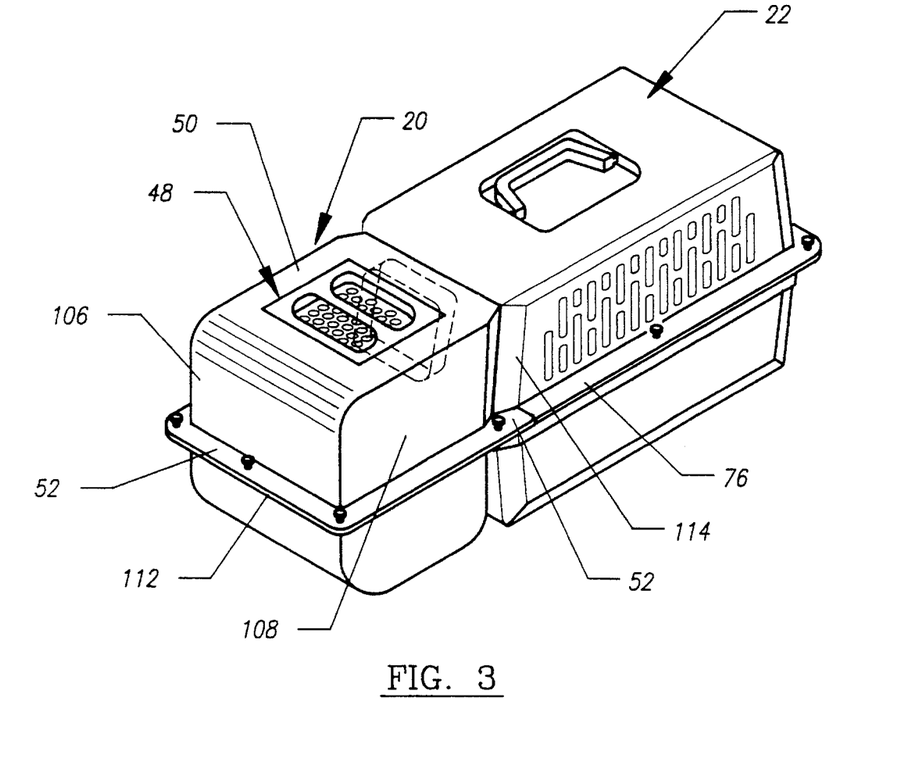
FIG. 3 shows an upper rear perspective view of the box of FIG. 2 in place on a conventional animal carrier.
Figure 3A:
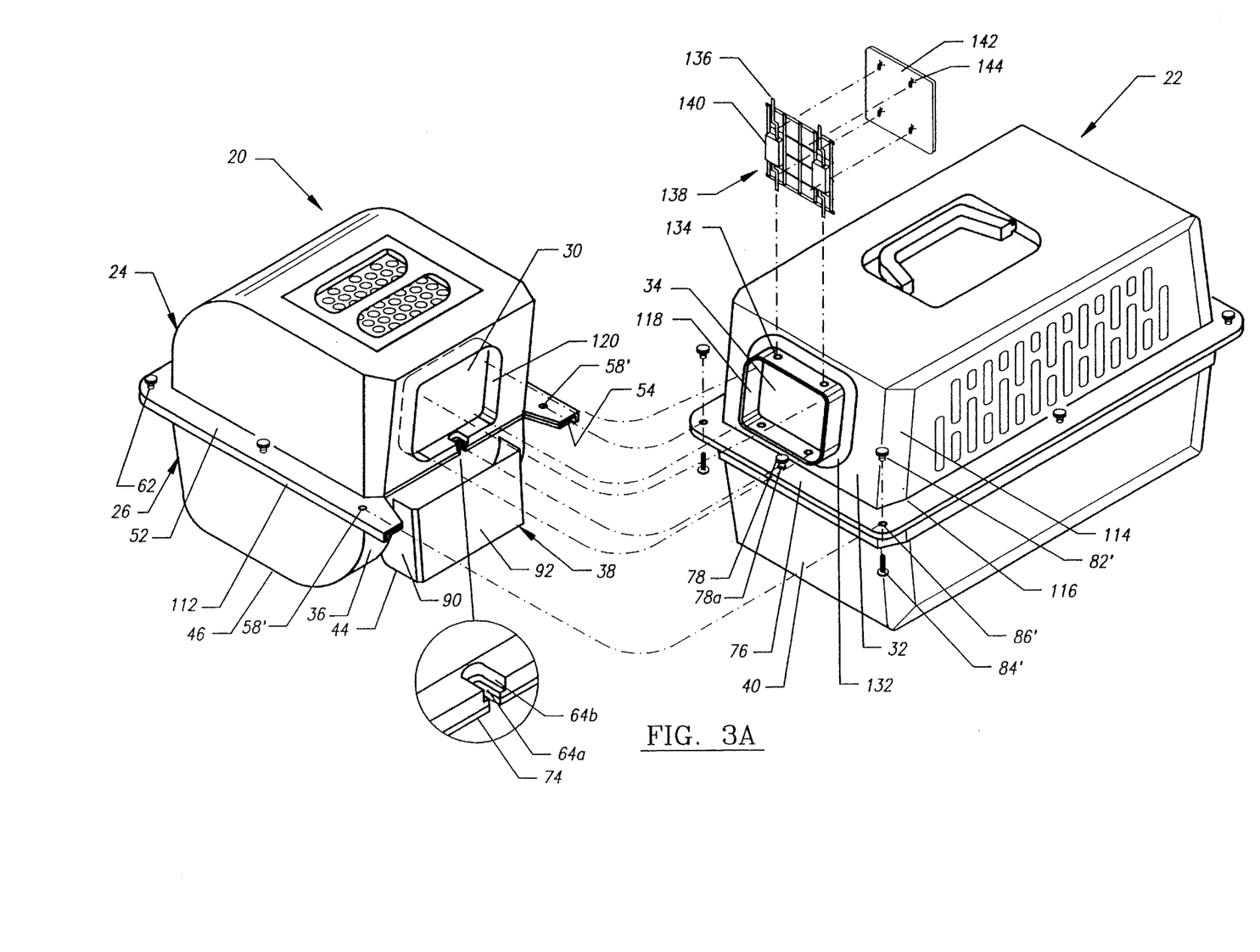
FIG. 3A shows an exploded perspective view of my assembled litter box freestanding, detached from any animal carrier. An adaptation of the carrier for use with the litter box is also shown.

Upper front wall 28 of the litter box, which has an opening 30 in it not visible in this drawing, is shaped to fit snugly against upper rear wall 32 of the carrier, which has a corresponding opening 34 in it, also not visible in this drawing but shown in FIG. 3A. Openings 30 and 34 are sized to allow passage of a cat or other animal between the carrier and the litter box.

Lower front wall 36 of the litter box has molded or otherwise connected to it a spacing compartment 38 which is shaped to fit snugly against lower rear wall 40 of carrier 22 when litter box 20 is attached to the carrier. The size and shape of compartment 38 act to help hold the litter box in place securely as a unit with the carrier when the carrier is lifted by a handle 42. This is accomplished because when litter box 20 and carrier 22 are attached together and placed on a flat surface, compartment 38 maintains the size and orientation of the space between lower front wall 36 of the litter box and lower rear wall 40 of the carrier. In other words, compartment 38 fills the space described sufficiently to maintain the existing distance between wall 36 and wall 40 when the carrier, in combination with the litter box, is lifted by handle 42.

At the same time, the shaping of upper front wall 28 to fit flush against upper rear wall 32 maintains pressure of wall 28 against wall 32 when the carrier is lifted. These features, in conjunction with the physical attachment method illustrated in FIG. 3A, ensure the secure and stable connection of litter box 20 to carrier 22. The entire combination of litter box 20 and carrier 22 illustrated in FIG. 2 can thus be lifted easily by handle 42 and held together as a congruous unit.

Base wall 44 of compartment 38 lies substantially in a plane with base wall 46 of litter box 20. This gives the litter box the stability necessary to stand on its own. Thus it may be used independently when not attached to the carrier. Compartment 38 is further illustrated in FIGS. 3A and 4, and additional features of compartment 38 are described subsequently.

DESCRIPTION—FIG. 3

FIG. 3 shows an upper rear perspective view of my litter box 20 attached to carrier 22. A vent 48 is visible in a top surface or wall 50 of litter box 20. Vent 48 is described in detail further on, as are the remaining reference numerals in FIG. 3.

DESCRIPTION—LITTER BOX

With reference primarily to FIG. 4 and also to FIG. 3A, it will be seen that litter box 20 comprises an upper section 24 and a lower section 26. This basic two-piece construction simplifies manufacture and makes the litter box easy to clean well. Each of these main sections is preferably molded in one piece, polypropylene being a common material for such a use. Recycled plastic can be used.

These two main sections of my litter box are joined together at mating flanged rims or lips 52 and 54. Each of these flanged lips is provided with a number of regularly spaced holes 58 and 56 which correspond in their placement on both lips. Thus when sections 24 and 26 are joined, bolts 60 may be inserted through these holes and fastened in place with nuts 62, securing the two main sections of the litter box together.

It will be understood by one skilled in the art that the number of holes is not critical as long as there is a sufficient number of holes to provide adequate structural strength to the litter box and secure, ungaping attachment of its upper and lower sections.

Lower section 26 has a bottom or base wall 46, spaced side walls 66, a rear wall 68, and a front wall 36. A horizontal flange, rim or lip 54 extends outward perpendicularly from the periphery of the upper edges of walls 66, 68, and 36. A flange 72 extends downward perpendicularly from the outer edge of lip 54, running along the outward side and rear portions only of lip 54. Flanged lip 54 on lower section 26 is sized to fit closely beneath and within a flanged lip 52 on upper section 24. Lip 54 has a number of spaced holes 56 for the purpose previously explained.

Lip 54 runs around the upper edges of all four walls of lower section 26. On a portion 74 of this lip, which runs along front wall 36, lip 54 lacks the downward flange 72 found on its other three sides. Lip portion 74 directly adjoins carrier 22 when litter box 20 is attached to the carrier (see also FIG. 3). Lip portion 74 is molded so that when the litter box and the carrier are joined, the full length of lip portion 74 will overlie that portion of flanged lip 76 on the carrier which runs along rear carrier wall 32 (see FIG. 3A). With reference to FIG. 3A, it will be seen that there is a nut 78 protruding from the center rear portion of lip 76 of the carrier. Lip portion 74 has molded into its center front edge a slot 80 (see FIG. 4). Slot 80 is of a width and length that permits lip portion 74 to slide forward at this point around the lower part of a shaft 78a of nut 78. This allows the front edge of lip portion 74 to abut the lower outside edge of upper rear wall 32 of the carrier, when litter box 20 is attached to the carrier. This feature, along with a complementary slot 64 of similar function on litter box upper section 24, contributes to the security of the connection between the litter box and the carrier, and to the ease of their interconnection.

The front edge of lip portion 74 is molded to follow the contours of rear carrier wall 32 when litter box 20 is in place against the carrier. It also follows the contours of beveled edge 114 of the carrier. This results in a widened and forwardly extended area at each front corner of lip 54 which will overlie carrier lip 76 when the litter box is attached to the carrier, and which narrows beyond holes 56'.

The front and inner edges of this extended area lack any downward flange, so that it may lie directly on the surface of carrier lip 76 (see FIGS. 3A and 3). Each widened and extended area at forward corners of lip 54 has a hole 56' in it which is placed so that when nuts 82' and bolts 84' are removed from carrier lip 76, and the assembled litter box is put in place against the carrier, holes 56' will lie directly over holes 86' on lip 76 of the carrier (see FIG. 3A).

Holes 56' and 58' on litter box lips 54 and 52, and holes 86' on carrier lip 76, have identical diameters. When bolts 84' are put in place through aligned holes 56', 58', and 86' and secured with nuts 82', litter box 20 will be firmly fastened to carrier 22. Additionally, all other securing holes—holes 56 on lip 54, and holes 58 on lip 52—are identical in diameter to holes 56' and 58', so that bolts and nuts of a corresponding size may be used interchangeably at any of these fastening points.

DESCRIPTION—SPACING COMPARTMENT

As shown in FIG. 3A, compartment 38 is molded or otherwise connected to lower front wall 36 of litter box 20.

Compartment 38 has a base wall 44 and spaced side walls 90, each of which has one edge connected to front wall 36. The opposite edges of walls 44 and 90 are connected to a front wall 92 of compartment 38. Compartment 38 has an unenclosed top opening, allowing the space within compartment 38 to be used in this embodiment for storage as set forth infra in "Operation."

As described earlier, base wall 44 of compartment 38 lies substantially in a plane with base wall 46 of litter box 20 so that the litter box has enough stability to be used independently when detached from carrier 22.

As explained before, compartment 38 is constructed so that when litter box 20 is attached to carrier 22, front wall 92 of compartment 38 will fit flush against lower rear wall 40 of the carrier, and side walls 90 of compartment 38 will run perpendicularly between front wall 92 of compartment 38 and front wall 36 of litter box lower section 26.

The top edges of walls 90 and 92 of compartment 38 stop short of lip portion 74 sufficiently to maintain unobstructed access to the space within compartment 38 when litter box 20 is detached from carrier 22 (see FIG. 4).

DESCRIPTION—FIG. 4

With reference to FIG. 4 it will be seen that upper section 24 of litter box 20 has a top wall 50. A vent 48 is provided on the upper surface of section 24. A vent cover 94, which is formed so that it also constitutes a handgrip 96, is in this embodiment attached to or molded into top wall 50.

Originating from the underside of top wall 50 and receding perpendicularly from it is a recessed lip 98 which extends along the entire outer perimeter of vent cover 94, defining a recessed space. Connected to the lower edge of lip 98 is a surface 100 which lies parallel to top wall 50, and which covers the area defined by the lower edge of lip 98. Surface 100 is regularly perforated by vent holes 102. The space between top wall 50 and surface 100 is of a depth which will accommodate fingers when using handgrip 96 and also a conventional charcoal litter box filter, if desired. The filter may be inserted into one of two openings 104 in vent cover 94 and worked into place to fill most of the recessed space laterally and part of it vertically.

Connected to top wall 50 are a rear wall 106 (see FIG. 3) and spaced side walls 108. Side walls 108 are beveled inwardly at their front edge to meet a front wall 28 which also adjoins top wall 50. The outer dimensions of front wall 28 are the same as those of upper rear wall 32 of carrier 22 (see also FIGS. 2, 3, and 3A). A horizontal flange, rim or lip 52 extends outward perpendicularly from the lower periphery of rear 106 and side 108 walls (see also FIG. 3). There is no lip along the bottom edge of front wall 28.

A flange 112 extends downward perpendicularly from the outer edge of lip 52, running continuously along the outward side and rear portions only of lip 52 (see also FIG. 3). Flanged lip 52 is sized to fit closely over flanged lip 54 on lower section 26. As previously mentioned, lip 52 is provided with a number of spaced holes 58 whose placement corresponds with that of holes 56 on lip 54 of lower section 26. Therefore when upper section 24 and lower section 26 are joined together, holes 58 in the lip of the upper section will overlie holes 56 in the lip of the lower section; and the two sections may be fastened together with bolts 60 and nuts 62.

The inner edge of lip 52, at the forward corners of upper section 24, follows the beveled lower edge of side wall 108 to the point where side wall 108 joins front wall 28. At this point (see also FIGS. 3 and 3A), the inner edge of lip 52 follows the lower contour of beveled edge 114 of carrier 22 (when the litter box is attached to the carrier), coming to an end at a point 116 (see the carrier in FIG. 3A) and proceeding at a right angle to meet the outside edge of lip 52. The free edge of lip 52 (where this protrudes from the juncture of the side and front walls of litter box upper section 24) and also the very front edge of lip 52 lack the downward flange 112 used on the outside edge of lip 52. As a result, mated lips 52 and 54 of litter box 20 may rest together directly on lip 76 of carrier 22 when the litter box is attached to the carrier (see FIG. 3).

DESCRIPTION—FIG. 4, CONTINUED

When upper section 24 is attached to lower section 26, the lipless bottom edge of upper front wall 28 rests on the very front verge of lip portion 74 of the lower section. Upper front wall 28 is designed to rest against upper rear carrier wall 32 when assembled litter box 20 is attached to carrier 22. (Accommodation made for protruding nut 78 on carrier lip 76 is described subsequently). Centered in upper front wall 28 is an aperture, entrance or access hole 30. Access hole 30 is sized to allow passage of a cat into the interior of the litter box, and to fit closely but easily around access hole lip 118 on the the carrier (see FIG. 3A). A good-sized, densely coated longhaired cat can pass through a hole 14 centimeters (5.5 inches) square; so a hole approximately that size is adequate for most cats, though the size of the hole may vary.

Connected to the periphery of access hole 30 and receding from the periphery perpendicularly into the interior of upper section 24 is a recessed lip 120. Lip 120 serves to reinforce both the edges of hole 30 and also the connection between the litter box and the carrier. Lip 120 also receives a flexible plastic seal 122. Seal 122 serves to enclose the contents of litter box 20 when the litter box is not in use, preventing spillage and release of odors. Seal 122 comprises a sealing surface 124 connected to a rim 126 with a beaded outer edge 128. The bead prevents edge 128 from being pushed into access hole 30 beyond the front surface of front wall 28. Connected to beaded edge 128 is a removal tab 130; seal 122 is pressed into place within access hole 30 and removed by gripping tab 130 and pulling. When not in use, seal 122 may be stored in compartment 38.

As previously described, slot 80 in lip portion 74 of lower section 26 is intended to slide around the lower part of shaft 78a of nut 78. Complementary slot 64 in upper section 24 is located in the center of the lowest side of lip 120, and extends through wall 28 below that point. As shown in detail in FIG. 3A, slot 64 has a narrower lower opening 64a into which the upper part of shaft 78a will slide, and a wider upper opening 64b which will accommodate the head of nut 78. This feature contributes to the effective securing of litter box 20 to carrier 22, and to the simplicity of their interconnection.

Attachment of my litter box to an animal carrier requires some adaptation of the carrier to receive the litter box. Carriers can be simply modified in their manufacture to incorporate a hole similar to access hole 34, and also a lip similar in function to lip 118 in FIG. 3A. The present litter box is designed in such a way that it can also be used with carriers already in existence, preventing waste and unnecessary expense; such carriers may be easily adapted to use with my litter box. My litter box is expected to be subjected to such design modifications as would make it, by means of designing varying versions, compatible with all major makes of animal carriers. This is a practical possibility as there is a limited number of major manufacturers of animal carriers; and most standard, widely available animal carriers have basic similarities.

Adaptation of carrier 22 shown in the drawings (see FIG. 1) is achieved (in an existing carrier) by cutting an aperture or access hole 34 in upper rear wall 32 of the carrier (see FIG. 3A). A utility knife or other appropriate tool is used. A template may be provided to ensure the proper placement, size, and shape of the access hole. Circumjacent to access hole 34 is a flange 132 which lies on the surface of wall 32, and which frames the perimeter of access hole 34. Connected to flange 132 and projecting perpendicularly from its inner edge is a rim or lip 118. Lip 118 is sized to fit closely but easily within lip 120 on litter box 20. Flange 132 and lip 118 are preferably molded as a single part, of a material such as polypropylene.

In adapting an existing carrier to receive litter box 20, flange 132 with attached lip 118 is secured to wall 32 of the carrier. The securing method must be reliable in order to assure the safe confinement of an animal within the carrier when the litter box is not attached to the carrier. In this embodiment acrylic foam tape such as that manufactured by 3M Industrial Specialties Division and sold under the trademark SCOTCH VHB, and model #4932 (25 mils thick) is used to attach flange 132 in place. When this tape is applied correctly to the polypropylene commonly used in the manufacture of animal carriers, the resulting bond is quite strong.

Backup fastening is preferably added, here in the form of small bolts run into flange 132 and through carrier wall 32. The bolts are secured with nuts; the nuts may be secured with a threadlocking adhesive. Bolt holes may be prefabricated in flange 132 and in precut foam tape. Treated in this way, the attachment of flanged lip 118 is completely reliable.

Lip 118 has in two of its opposite sides four holes 134. Holes 134 are sized and spaced to receive posts or extensions 136 of a door 138. In this embodiment, door 138 is made of heavy-duty steel-wire mesh, coated with chrome or vinyl to prevent rusting. Door 138 is provided in this embodiment with two spring-latching mechanisms 140 of a type commonly used on the doors of commercial animal carriers. The horizontal portions of the posts leading from extensions 136 are compressed between a finger and thumb, causing extensions 136 to be pulled in; this allows extensions 136 to be released from or placed for insertion into holes 134. When the posts of mechanism 140 are released, extensions 136 again protrude from the outer edges of door 138 and into holes 134, efficiently securing door 138 in place. Leaving one mechanism 140 secured and releasing extensions 136 controlled by the other permits door 138 to swing outward; activating both mechanisms 140 permits easy removal of door 138 from (or its insertion into) lip 118.

Door 138 is provided so that carrier 22 may be used without litter box 20 in place and still be extremely secure against the escape of an animal. When door 138 is removed from lip 118 so that the litter box may be attached to the carrier, door 138 may be stored within compartment 38 along with seal 122.

Door 138 is provided in this embodiment with a cover 142 to maintain the feeling of sanctuary provided by the previously unbroken wall 32 of the carrier. This is particularly important for cats, which need a sheltered atmosphere available to them. Cover 142 is made in this embodiment of a material such as polypropylene. Cover 142 is attached to the mesh of door 138 in this embodiment by plastic keepers 144, which are molded into one surface of cover 142. Keepers 144 snap into place on the wire mesh of door 138.

OPERATION

To use the litterbox, upper section 24 of the litter box is placed against its lower section 26 at mating flanged lips 52 and 54. Holes 58 and 58' will then be aligned with holes 56 and 56'; bolts 60 and 60' are inserted through these holes and secured with nuts 62 and 62'.

Before assembling litter box 20 in this way, a standard (preferably heavy-duty) plastic litter box liner may be placed in lower section 26 with its edges draped over lip 54. A liner adds to the ease of cleaning the litter box and is held in place by the subsequent assembly process; the liner is simply punctured by pushing bolts 60 and 60' through the holes in mated lips 52 and 54.

During transport of the litter box, seal 122 may be used to prevent the spilling of litter and the release of odors. Seal 122 is simply pushed into place within access hole 30 and may be removed by pulling outward on tab 130. When removed, seal 122 may be stored within compartment 38.

If the use of a standard charcoal litter box filter is desired, the filter is pushed into one of holes 104 on top wall 50 of the litter box and worked into place to cover most of recessed vent surface 100. The litter box may be lifted by handgrip 96.

Litter is placed in the bottom of the assembled litter box, which is then ready for use by itself. It is also ready for subsequent attachment to a carrier.

As previously mentioned, animal carriers may be simply modified in their manufacture to incorporate a litter box-accommodating access hole, and a lip similar in function to lip 118 in FIG. 3A. If however an existing animal carrier (as shown in FIG. 1) is to be used with my litter box, a one-time adaptation of the carrier is required. Adaptation is achieved (see FIG. 3A) by cutting access hole 34 in upper rear carrier wall 32, and finalized as in "Description".

The carrier is then ready to be used with or without my litter box attached. To use the carrier independently, door 138 is inserted into lip 118: the posts of latching mechanisms 140 are compressed, door 138 is placed within lip 118, and the posts are released, causing extensions 136 to protrude through holes 134. (Cover 144 is first clipped to the inside surface of door 138 and may be left in place thereafter; this provides privacy for the animal within the carrier). Door 138 maintains the escape-proof integrity of the carrier, and when door 138 is in place the carrier may be used in its usual fashion.

To attach my litter box to the carrier (referring still to FIG. 3A) nuts 82' and bolts 84' are removed from holes 86' on the carrier. Door 138 is removed from lip 118 by compressing the posts of mechanisms 140. Door 138 may be stored in compartment 38 of the litter box, along with removed nuts and bolts and seal 122.

Nuts 62' and bolts 60' are removed from aligned holes 56' and 58' on the litter box (see also FIG. 4). Seal 122, if in place on the litter box, is also removed.

The litter box is then put in place on the carrier. Lip 118 on the the carrier slides inside lip 120 on the litter box. Nut 78 on the carrier slides into aligned slots 80 and 64 on the litter box (see also FIG. 4), providing attachment at that point. The forward, projecting corners of mated flanged lips 54 and 52 rest on the rear corners of lip 76 on the carrier. Holes 56' and 58' on the litter box are then naturally aligned with holes 86' on the carrier. Attachment is finalized by running a bolt through each set of aligned holes and securing each bolt with a nut (see FIGS. 2 and 3). The carrier will then function as a tight, cohesive unit with my litter box, the whole capable of being lifted by carrier handle 42 when empty or when an animal is in the carrier. Handgrip 96 on the litter box is a supplementary lifting point if the weight of animal is in the litter box. Items stored in compartment 38 will be naturally contained when the litter box and the carrier are joined together and are upright.

An animal may pass freely between the litter box and the carrier through conjoined access holes 30 and 34, eliminating the problems associated with the use of a separate litter box and carrier when traveling. The unit is inescapable, so the animal is protected and well-confined. The animal can relieve itself whenever it feels the need, without the discomfort of having no ready spot to do so, and without the stressful and extremely inconvenient necessity of eliminating in its carrier. Any litter tracked from the litter box will be mostly confined to the carrier, which may be easily cleaned by shaking out a towel or similar comfortable lining used in the carrier. The animal has additionally some potential for exercise and variety in its small space, and an additional sanctuary. The peace of mind engendered by this altogether improved, humane situation makes travel safer and more relaxed and enjoyable for all concerned. Any time the carrier is needed by itself, conversion is quickly made and the litter box may be sealed against spillage. An animal may be safely contained within the carrier while the litter box is being cleaned. The litter box may be used by itself in non-traveling situations, or the carrier may be left (with its front door open) attached to the litter box, to reduce the mess of material normally tracked from the litter box. The litter box is easily detached and disassembled for cleaning.

Training a cat to use the litter box is simple. Cats are instinctively inclined to explore holes and small enclosures, and will often naturally enter the litter box from the carrier, via the access hole. Once a cat knows that litter is available, it will gladly enter the litter box to eliminate when necessary. It will return thereafter to the carrier in preference to remaining in the used litter box. A cat also will often spend time in the box while the litter is clean.

If a cat does not immediately discover its access to litter, this is easy to demonstrate. The bottom section only of the litter box (containing litter) is attached to the carrier, leaving the attachment bolts unsecured by nuts. The cat is placed in the carrier and the carrier's front door is closed. The cat will (or can be enticed to) leave the carrier by stepping through carrier access hole 34. Once it has done this, thus stepping into the litter box, the top section of the litter box is put into place. The cat will see the carrier space through the access hole and know that it can return, having been through the hole before.

Alternatively, a cat may be placed in the carrier (with the assembled litter box attached), the carrier door closed, and the cat attracted into the litter box by making intermittent small scratching noises on the outside of the litter box. Most cats will soon investigate these sounds, entering the litter box through the access hole.

SUMMARY, RAMIFICATIONS, AND SCOPE

Thus the reader will see that the present litter box is simple, effective, and versatile. It presents a unified solution to a full range of problems previously inherent in living and travel with animals such as cats. It provides unprecedented humaneness, neatness, convenience, and safety.

Designed to work with widely used animal carriers, my litter box greatly enhances their function. The use of a carrier in combination with my litter box enables a securely confined animal to relieve itself neatly and independently, at will. The animal is well sheltered while relieving itself. The animal never remains forcibly exposed to excrement, urine, or used litter. This removes major sources of stress, discomfort, and inconvenience.

The use of this combination offers, during travel, singular containment of litter and animal waste, keeping a vehicle clean.

These features combine to give a level of peace of mind and relaxation previously not available to people transporting or traveling with animals such as cats.

The litter box is easily removed from the carrier. When it is removed, the security of the carrier is simple to restore. Thus the carrier may be used alone, or an animal may be safely confined within the carrier while the litter box is cleaned.

When the litter box is detached from the carrier, the box is easily sealed against spillage, making it simple and safe to stow. The litter box may also be used by itself, without the carrier. It is light, durable, and easily cleaned. Its manufacture takes advantage of already established methods and materials. Manufacture is straightforward for a manufacturer already producing animal carriers.

The combination of the litter box and the carrier makes extended travel with animals such as cats feasible and enjoyable. Boarding costs, and animal stress from boarding, may be eliminated. The combination is equally practical on trips just an hour or two in length, since a cat's eliminative needs are unpredictable. In either case driving is safer and more relaxed, and sanitation and health are enhanced. Responsible, loving animal care is promoted.

Furthermore, the litter box may be used at home or a destination with a carrier attached. With the carrier door left open, an animal may use the litter box, but the litter tracking commonly occurring from a litter box is substantially reduced. Litter tracking accurs in greatest concentration just outside a litter box entrance. This means that the carrier in this case will recieve most tracked litter. The carrier may be vacuumed clean, or lined with a towel or other material from which tracked litter can be shaken occasionally. This reduces mess considerably in non-traveling situations.

While my above description contains many specificities, these should not be construed as limitations on the scope of the invention, but rather as an exemplification of one preferred embodiment thereof. Many other variations are possible.

For example, as mentioned before, the litter box is intended to be styled to harmonize physically and visually with any style of animal carrier. Size, lines, and proportions, as well as fastening methods, may be changed to adapt the litter box to any carrier existing now or developed in the future. The litter box can also be incorporated into the design of an animal carrier, as a removable part of a carrier.

The construction details can be varied. With regard to functions performed by the spacing compartment, for example, many modifications are possible. The spacing compartment can be eliminated. The lower section of the litter box in this case can be molded so that its front wall fits flush against the lower rear section of the carrier, encompassing the area otherwise used for the spacing compartment. The litter box would have no storage space on it, in this case. In another option the spacing compartment is eliminated. The required spacing and litter box stability is achieved with spacers of some other type, such as wings, bars, posts, or other structural elements. If the spacing compartment is eliminated, a storage compartment can be added to hold the access hole door, the seal, and the hardware. The spacing compartment can be designed so that the access hole door can be removed from the storage space before detaching the litter box from the carrier; then the door may be held ready to block the access hole when the litter box is removed from the carrier. The spacing compartment can be designed with a cover to keep litter box debris from falling into it when the litter box is used independently (it is naturally covered when the litter box is in place on the carrier). This will also contain stored items well.

Other ways of closing the access hole on the carrier are also useable. One provides a flat door which slides into place (simple structures being mounted to receive it) and is held with spring clips or other fasteners. If this door slides in from the top, attachment of the litter box is simplified if the carrier is occupied by an animal intent on escape. The sliding door is removed once the litter box and the carrier are mostly in place for attachment. The access holes, access hole lips, and surrounding structures can be modified to this end. Other door treatments, including various ways of latching or securing the door and the carrier access hole lip, can also be provided.

A freely swinging flap may be attached to the upper inner edge of the litter box access hole rim to augment the separation of the litter box from the animal carrier.

It is possible to eliminate the protruding rim where the upper and lower sections of the litter box are joined. The upper and lower sections can slide and lock or snap together, eliminating the fastening hardware otherwise necessary. The method used to attach the litter box to the carrier can be modified to work with this different system. Numerous other ways exist for fastening the two sections of the litter box together, and also for attaching the litter box to the carrier. These encompass both shape and hardware. For example, spring clips, latches, or snap closures can be used. The two litter box sections can be hinged together at the rear. (In this case a molding or channel around the bottom edges of the upper section may fit down over the top edges of the lower section; the two sections can be secured at the points where the litter box is attached to the carrier). Construction of the litter box can even be made one-piece with a large access door for cleaning.

A transparent window may be included on the litter box to simplify checking the condition of the contents when the litter box is attached to the carrier. A vent can easily be located on the side or back of the litter box instead of on its top, to accommodate the stacking of carriers. The litter box design can be altered to allow nesting of the two sections when the litter box is not in use, for easier storage. Small legs or projections can be included on the bottom of the litter box to raise it slightly from its substratum, limiting condensation. A cover can be added over slot 64 (see FIG. 4) to prevent debris from getting into the slot when the litter box is being used by itself. (It is covered naturally when the litter box is attached to the animal carrier). All inner litter box contours can be rounded for ease of cleaning. Different fastening methods, such as spring clips or cotter pins, can be used to attach flange 132 (FIG. 3A) to the rear wall of the animal carrier, as long as such methods can be made safe to an animal if they come through the carrier wall.

The litter box may also be used with an enclosure in any situation where an animal is closely confined, as in a veterinary hospital or at a cat show. The confining cage is modified by an aperture, preferably securely closable when the litter box is not attached to the cage. The litter box is designed with a shape and attaching method appropriate to the situation. In the case of a cage with vertical bars, for example, rubber-coated or plastic-coated bar clamps incorporated into the litter box design will work well to attach the litter box to the cage. Such clamps can be made with rounded surfaces to accomodate the cage bars. On lightweight bars such as those used in cages at cat shows, a good method of attachment is the use of a set of revolvable bars attached to the litter box, lying a short distance from its front surface (the distance is achieved by the length of the post around which the revolvable bars pivot). These bars are left in a vertical position as the litter box is placed in position against the cage, and are thus pushed beyond the cage bars into the interior of the cage. They are then rotated to a horizontal position, securing the litter box to the cage. Different fastening methods are easily contrived as well.

The litter box may be used for other animals—dogs, rabbits, and ferrets, for example—in addition to cats.

A disposable version of the described litter box is another possible ramification. This involves the use of inexpensive materials, such as cardboard with a partial wax or plastic coating. Simplified design is preferable in a disposable version, involving elimination of the spacing compartment as described above and a simplified vent, for example.

These and many other alterations of the structure herein disclosed will suggest themselves to one skilled in the art. Accordingly, the scope of the invention should be determined by the appended claims and their legal equivalents, rather than by the embodiment illustrated.

I claim:

1. An animal litter container, comprising:
   a) a physically discrete enclosed box able to effectively contain litter while said litter is actively being used by an animal, said enclosed box having a plurality of sidewalls, each of said sidewalls being substantially solid,
   b) an aperture sized to allow the passage therethrough of said animal into said enclosed box, said aperture being provided in one of said sidewalls of said enclosed box and substantially entirely in the upper half of said one of said sidewalls, and
   c) attaching means in or closely adjacent to said one of said sidewalls for removably securing said enclosed box to one substantially solid sidewall of a physically discrete animal carrier having an aperture therein, such that said aperture in said enclosed box can mate with said aperture in said animal carrier,
   d) whereby said animal can move from said animal carrier to said enclosed box for eliminating bodily wastes within said enclosed box and can thereafter return to said animal carrier.

2. The invention of claim 1, further including means for enabling said enclosed box to stand stably on its own.

3. The invention of claim 1 wherein said enclosed box is made of an upper section and a lower section, said upper and lower sections being attached together.

4. The invention of claim 1, further including means for selectively sealing said aperture in said enclosed box, thereby preventing litter and odors from escaping said enclosed box when said enclosed box is temporarily stored.

5. In an animal carrier comprising an enclosure having (a) a plurality of sidewalls, all of said sidewalls having enclosing means and at least two of said sidewalls being substantially solid, (b) ventilation means, and (c) means for allowing the insertion of an animal into or the removal of said animal from said enclosure, the improvement comprising an aperture in one of said substantially solid sidewalls, said aperture being located substantially entirely in the upper half of said one of said sidewalls, said aperture having a predetermined size for allowing the passage therethrough of an animal of a predetermined size, said aperture being placed to allow the passage therethrough of said animal from said enclosure to a mateable opening in a physically discrete enclosed box able to effectively contain litter, said enclosure also having attaching means for removably securing said enclosed box to said enclosure, said attaching means being located substantially outwardly from said aperture and in or closely adjacent to said one of said sidewalls of said enclosure, whereby said animal can move from said animal carrier to said enclosed box for eliminating bodily wastes within said enclosed box and can thereafter return to said animal carrier.

6. The invention of claim 5, further including means on said enclosure for securely and selectively closing said aperture to prevent the escape of an animal.

7. The invention of claim 5 wherein said animal carrier is made of an upper section and a lower section, said upper and lower sections being attached together.

8. A combined litter container and animal carrier, comprising:

(a) a physically discrete enclosed box able to effectively contain litter while said litter is actively being used by an animal, said enclosed box having a plurality of sidewalls, all of said sidewalls being substantially solid, said enclosed box having an aperture sized to allow the passage of said animal therethrough into said enclosed box, said aperture being located in one of said substantially solid sidewalls, said aperture further being located substantially entirely in the upper half of said one of said sidewalls, (b) a physically discrete animal carrier sized for the convenient transport of domestic companion animals, said animal carrier having a plurality of sidewalls, at least two of said sidewalls being substantially solid, one of said substantially solid sidewalls having an opening therethrough, said opening being sized to allow an animal to pass therethrough, said opening being located substantially entirely in the upper half of said one of said sidewalls, said opening being placed to allow the passage of said animal from said animal carrier into said aperture on said enclosed box, and c) attaching means in or adjacent to said one of said sidewalls of said enclosed box, and attaching means in or adjacent to said one of said sidewalls of said animal carrier, said attaching means on said enclosed box and said attaching means on said animal carrier being securely and releasably interconnected together such that said aperture on said enclosed box closely aligns with said opening on said animal carrier, (d) whereby said animal can move from said animal carrier to said enclosed box to eliminate bodily waste within said enclosed box and can thereafter return to said animal carrier.

9. The invention of claim 8 wherein said enclosed box has a recessed lip circumjacent to said aperture in said enclosed box, and said animal carrier has a projecting lip circumjacent to said opening in said animal carrier, said recessed lip of said enclosed box being sized to fit around said projecting lip of said animal carrier.

10. The invention of claim 8, further including means for selectively sealing said aperture in said enclosed box, thereby preventing litter and odors from escaping said enclosed box when said enclosed box is temporarily stored.

11. The invention of claim 8, further including means on said animal carrier for selectively and securely closing said opening in said animal carrier to prevent the escape of said animal.

12. The invention of claim 8 wherein said enclosed box is made of an upper section and a lower section, said upper and lower sections being attached together.

13. The invention of claim 8 wherein said animal carrier is made of an upper section and a lower section, said upper and lower sections being attached together.

14. The invention of claim 13 wherein said enclosed box is made of an upper section and a lower section, said upper and lower sections being attached together.

15. The invention of claim 8, further including means for enabling said enclosed box to stand stably on its own.

* * * * *